United States Patent [19]

Vilkaitis

[11] 3,940,718

[45] Feb. 24, 1976

[54] FLEXIBLE WAVE GUIDE AND METHOD FOR MAKING SAME

[75] Inventor: Hugo L. Vilkaitis, Thomaston, Conn.

[73] Assignee: Tech Systems Corporation, Thomaston, Conn.

[22] Filed: Feb. 11, 1974

[21] Appl. No.: 441,422

[52] U.S. Cl. ................ 333/95 A; 138/121; 138/173

[51] Int. Cl.$^2$... H01P 3/14; F16L 11/14; F16L 9/06

[58] Field of Search ........................ 333/95 R, 95 A; 138/121-122, 173

[56] References Cited

UNITED STATES PATENTS

| | | | |
|---|---|---|---|
| 3,090,019 | 5/1963 | Johnson et al. | 333/95 A |
| 3,822,412 | 7/1974 | Carlin et al. | 333/98 R |

FOREIGN PATENTS OR APPLICATIONS

| | | | |
|---|---|---|---|
| 739,488 | 11/1955 | United Kingdom | 333/95 A |
| 496,288 | 9/1953 | Canada | 333/95 A |

OTHER PUBLICATIONS

Doughty, D. J., "Waveguide Components—A Survey Of Methods Of Manufacture & Inspection," components — Brit. IRE, 2-1961, pp. 169, 171-173, 181.

*Primary Examiner*—Alfred E. Smith
*Assistant Examiner*—Wm. H. Punter
*Attorney, Agent, or Firm*—Pennie & Edmonds

[57] ABSTRACT

A flexible multilayer wave guide and method of making the same is disclosed. The wave guide comprises a flexible section for propagating microwaves and a pair of coupling elements for connection to existing microwave units. The flexible section is corrugated and has an outer layer made of a flexible and strong metal. Its inner surface comprises a relatively thin layer of a highly conductive metal which is supported by the outer layer and gives the wave guide the desired electrical properties.

A method of fabrication involving the deposition of the inner conductive layer and the outer support layer of the wave guide on an arbor is also disclosed. This technique allows the fabrication of a wave guide with a far greater number of convolutions along its length than was possible using prior art mechanical manufacturing methods. In the preferred embodiment, the arbor is made of metal, and the inner layer and outer layer are successively deposited on the arbor by electrodeposition. After the electrodeposition process has been completed, the plated arbor is then put in a chemical bath which dissolves the arbor, leaving the flexible section. The flexible section is then machined and welded or soldered to suitable coupling flanges.

6 Claims, 7 Drawing Figures

FLEXIBLE WAVE GUIDE AND METHOD FOR MAKING SAME

BACKGROUND OF THE INVENTION

The increasing utilization of microwave communication systems for the transmission of data has created a substantial need for a flexible wave guide exhibiting both low losses and uniform electrical characteristics in the millimeter microwave region. This need is especially acute in systems operating in the 20–150 GHz. range, where space considerations or mechanical limitations do not always permit the transmission of microwave energy from one item of equipment to another along a straight line path.

A number of flexible wave guides are currently being used in the microwave industry. One of the commonly used prior art flexible wave guides is the interlocking type which is made by spirally winding a strip of metal whose edge portions are folded and compressed during winding to form an interlocking structure. During flexure, the interlocking edges slide over each other, allowing the wave guide to assume the desired shape. This particular type of wave guide can be made with any desired cross-sectional shape, but is usually formed with a rectangular cross section insofar as the polarization characteristics of a wave guide with this cross section are the easiest with which to design. Although a wave guide of this kind works well at lower frequencies, its performance precipitously declines at higher frequencies, due to irregularities on the inner surface of the wave guide.

In an attempt to improve upon this type of flexible wave guide, some wave guides have been designed which include an interlock configuration which does not permit sliding. At the same time, U-shaped corrugations are provided between the interlocks. During flexure, these corrugations expand, compensating for the loss of flexibility caused by the inability of the interlock structure to slide. See, for example, U.S. Pat. No. 3,331,400. However, even this wave guide structure is unsuitable for use in the 20–150 GHz. range. The mechanical fabrication of a convoluted wave guide invariably results in a wave guide which includes irregularities which cause unacceptable attenuation in the millimeter microwave region due to the impossibility of manufacturing a wave guide having small enough convolutions to operate efficiently in the higher frequency microwave regions.

The inadequacies of these mechanically fabricated prior art wave guides are eliminated by the fabrication of a wave guide through the deposition of successive metallic layers upon a convoluted, chemically dissolvable arbor. Naturally, these metallic layers of the wave guide, which form the main section, conform to the shape of the arbor. Although multilayer plating processes have been used in the past, this technique has not been employed in the fabrication of wave guides which have extremely small convolutions. See, for example, U.S. Pat. No. 2,592,614.

Still another attempt to fabricate a high frequency microwave wave guide involves taking a non-grooved section of tubing and mechanically crimping it into an accordion-like shape. See U.S. Pat. No. 2,751,561. However, this type of device, like other mechanically manufactured convoluted wave guides, will not function in the millimeter region. This is due to the fact that it is not mechanically possible, using this techinque, to manufacture a wave guide with convolutions small enough to allow operation in the millimeter region. As one attempts to crimp the tubing with smaller and smaller convolutions, the convolutions become distorted and then become impossible to make.

SUMMARY OF THE INVENTION

In accordance with the present invention, a far superior microwave wave guide is provided. This wave guide functions excellently in the millimeter wavelength region. It is very durable and may even be subjected to repeated usage in different systems. The method provided for the fabrication of this wave guide, besides being relatively simple to implement, allows the manufacture of wave guides having properly formed convolutions far smaller than those found in prior art wave guides.

The wave guide of the present invention includes a flexible section having convoluted sides which are continuous, that is to say not made of a plurality of joined together surfaces, and of multilayer construction. The inner layer is very thin and made of a material selected for its high conductivity. The inner layer presents a highly conductive inner surface which is especially important in wave guide design. The outer layer, which is somewhat thicker than the inner layer, is made of a material selected for its mechanical strength, durability, and resiliency. The outer layer performs the complementary function of supporting the inner layer and giving the guide the desired mechanical properties. This combination of an inner layer selected for its electrical characteristics and an outer layer selected for its mechanical characteristics results in a very flexible wave guide which has excellent mechanical and electrical characteristics.

In the preferred embodiment, the inner layer is made of any highly conductive metal, such as silver or gold, and the outer layer is made of another metal, such as nickel. Of course, the composition of the outer layer does not affect the electrical characteristics of the device, and may be made from a wide variety of materials including synthetic materials, such as polymer plastics. The wave guide is formed by deposition of the two metallic layers upon a metallic arbor. In the preferred embodiment, such deposition is done by electroplating, although any other suitable technique, such as vacuum deposition may be employed. The arbor is first plated with silver and then plated with nickel. The arbor, with the two metallic layers deposited on it, is then put in a chemical solution which dissolves the arbor, leaving the flexible wave guide section. The edges of the section are then machined and suitable coupling flanges soldered to its ends. A layer of flexible rubber is preferably put around the wave guide as a protective housing.

DETAILED DESCRIPTION OF THE PREFERRED EMBODIMENT

Figure 1:
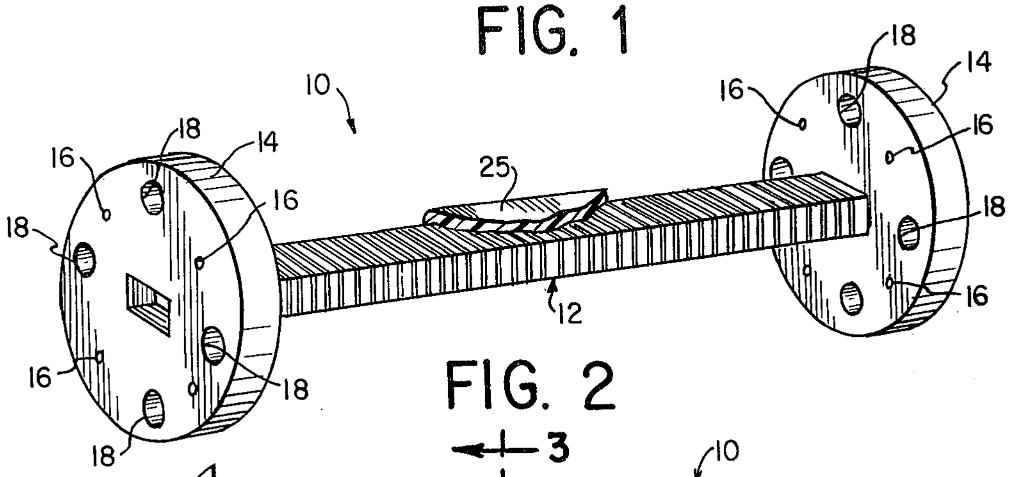
FIG. 1 is a perspective drawing of a flexible wave guide constructed in accordance with the present invention with part of the protective housing cut away to show the convoluted surface of the wave guide.

Referring to FIG. 1, a wave guide 10 constructed in accordance with the present invention is illustrated. The wave guide comprises a flexible section 12, with coupling flanges 14 soldered to its ends. The coupling flanges include holes 16 for receiving line-up pins and somewhat larger holes 18 for receiving mounting screws.

Figure 2:
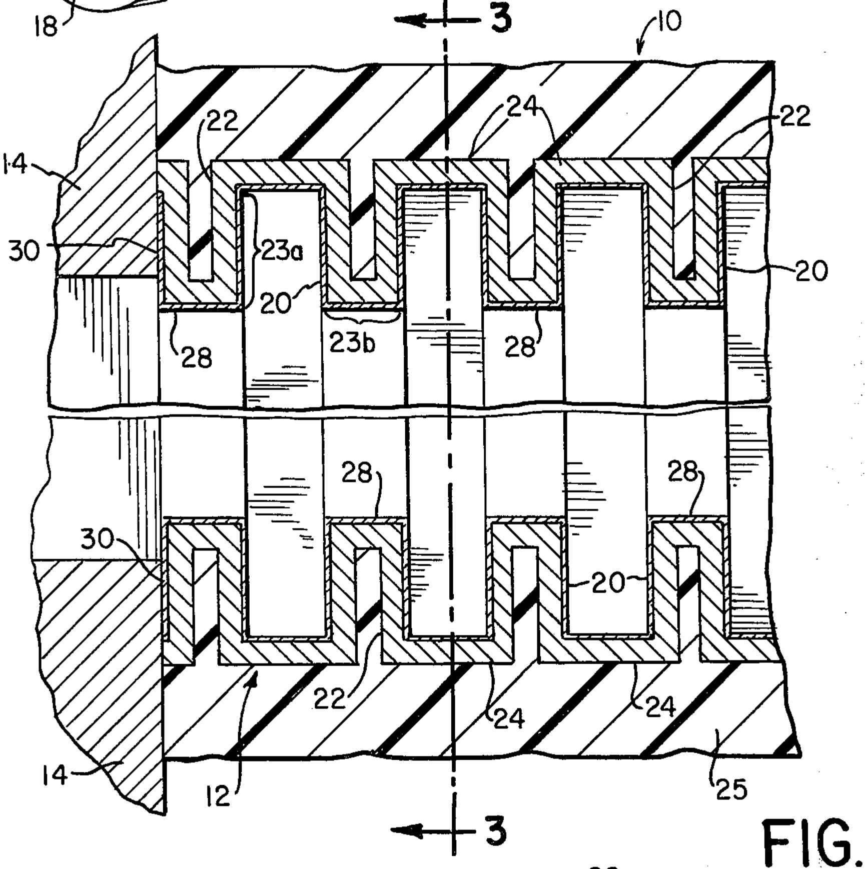
FIG. 2 is a greatly magnified detail in cross section of the construction of the wave guide shown in FIG. 1.

Referring to FIG. 2, the wave guide is of multilayer construction, comprising a highly conductive inner layer 20 made of silver and a mechanically durable support layer 22 made of nickel. The metals used should be substantially free of impurities in order to assure the mechanical durability of the wave guide. In particular, the nickel should contain no more than 0.2% impurities. The purity of the nickel is most important insofar as it provides the mechanical strength and flexibility of the wave guide. Impurities tend to make the nickel brittle. The thickness of silver layer 20 is in the range of about 0.0002 to 0.0003 inches. The thickness of nickel layer 22 should be significantly greater due to the support function of the nickel and is in the order of 0.0012 inches. The depth 23*a* of the convolutions is in the order of 0.0060 inches. The width 23*b* is in the order of 0.0040 inches.

Figure 3:
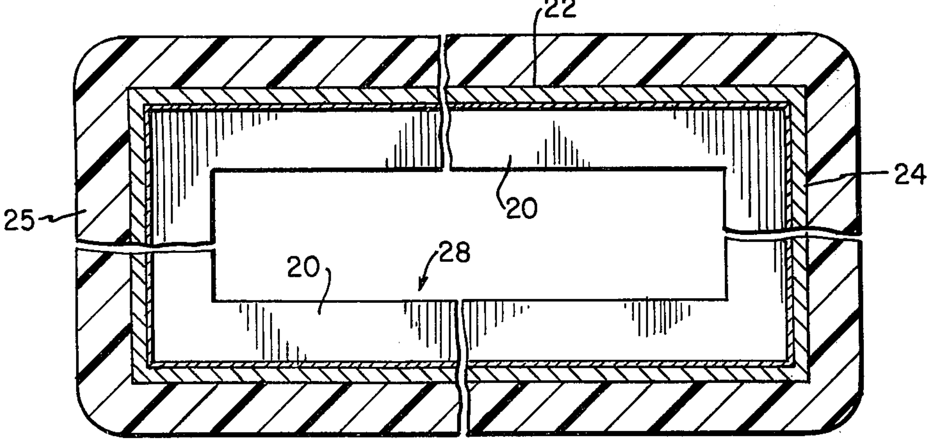
FIG. 3 is a view in cross section along lines 3—3 of FIG. 2.

As can be seen most clearly in FIGS. 2 and 3, the cross section of flexible section 12 is slightly larger than the cross section of the transmission portion of coupling flanges 14. In accordance with standard flexible wave guide techniques, this minimizes the effects of discontinuities in the flexible section. The magnitude of the cross-sectional difference is determined using conventional techniques and results in the minimization of losses due to the discontinuities in the flexible section.

Flexible section 12 comprises a continuous surface and includes outer corrugations 24 and inner corrugations 28. An adjoining inner and outer corrugation together form a convolution which presents slight irregularities that, however, do not affect the performance of the wave guide in any substantial manner. This is due to the fact that the size of the convolutions is substantially smaller than the wavelength of the highest frequency signal for which the wave guide is to be used. An acceptable degree of performance can only be obtained when there are a minimum of about 12 convolutions for every wavelength for the smallest wavelength along the length of flexible section 12. For example, if the guide wavelength or the wavelength in the wave guide of the highest frequency signal to be transmitted is 1 cm., then the minimum number of convolutions along the length of the wave guide would be 12 convolutions per centimeter. Any increase in the number of convolutions above the minimum will improve performance, while a decrease will degrade performance. Added strength is given to the wave guide by coating the flexible section with a plastic jacket 25, which may be made of a silicone rubber, such as G.E. RTV 560 or any other suitable material.

Referring to FIG. 3, it is seen that the wave guide constructed in accordance with the preferred embodiment would have a rectangular cross section and a height to width ratio of 1 to 2 . This cross section is selected for its very desirable polarization properties. Of course, any other conventional cross section may be selected, and such selection would be made by taking into account various system requirements. Typically, the wave guide would have a height and width in the order of ⅛ inch by ¼, be 2 or 3 inches long, and operate well for microwaves having a wavelength in the order of 7.5 mm.

Figure 4:
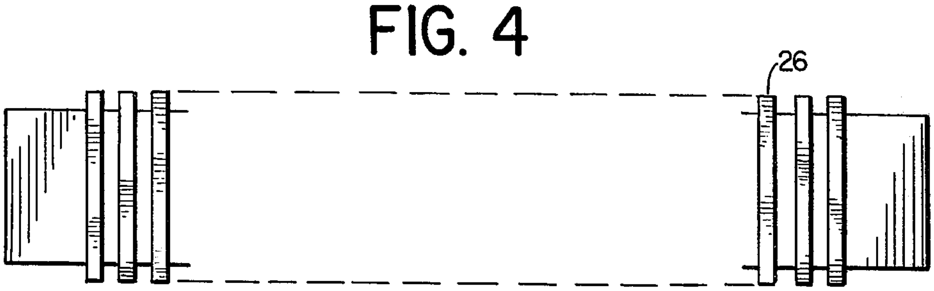
FIG. 4 is a side elevation of the arbor used in the fabrication of the wave guide.

The wave guide is fabricated by electrodeposition of successive layers of metal upon an aluminum arbor 26 as illustrated in FIG. 4. In the preferred embodiment, the arbor 26 is made of aluminum and cut to the desired size. A rotary carbide saw may be advantageously used to machine the arbor. A climbing cut, that is one in which the arbor stock is advanced across the saw in a direction counter to that in which the cutting surface of the saw moves, is used. This results in an arbor that is very precisely machined. Alternatively, the arbor could be made of plastic and be formed by injection molding techniques, and then treated for the subsequent electrodeposition of the wave guide.

It is very important that the arbor be free of burrs and loose chips. These defects, if allowed to remain, will cause irregularities. A microscope is therefore used to inspect the arbor for any defects of this kind. After the arbor has been cut and inspected, it is then put in a bath of non-etch cleaner, such as Enthone NE6 for 1–3 minutes and then rinsed in cold running water. After the non-etch cleaner has been removed by the cold running water, the arbor is next placed in a pickle bath containing $HN0_3$ and HF for 15 seconds. The pickle bath is prepared by mixing seven gallons of 36° baume nitric acid, six pounds of Enthone Actane 70, and 11 gallons of water. The arbor is then rinsed in cold running water, and put in a zincate bath prepared by dissolving one pound of Enthone Alumon D in a gallon of water. It is also desirable to maintain this solution at 115°F. This bath leaves a thin zinc film which is an ideal surface for subsequent plating. The arbor is now ready for the electrodeposition process.

Before plating, it may be desirable to cover the ends of the arbor with a non-conductor to prevent the unnecessary deposition of metal on the ends of the arbor. After the arbor has been prepared for electroplating, it is placed in a plating solution and plated with a thin layer of silver for a short period of time with a very high current. This process is known as a silver strike, its purpose being to plate the arbor with a silver surface which is relatively rough and adapted to securely bind subsequent layers of silver. The silver strike solution comprises ½–¾ ounces of AgCn and 10–12 ounces of KCn per gallon of water. The arbor is connected to the negative terminal of a 6-volt D-C source and is separated from the positive terminal by about 15 inches. However, electrode spacing is not critical. The silver strike lasts about 30 seconds. After the silver strike has been completed, the arbor is then removed and rinsed in cold running water for 1 to 2 minutes.

After the arbor with the relatively rough silver surface has been rinsed, it is then put in a silver plating solution for the application of the final layer of silver. This plating step takes 20 minutes and is performed in a solution containing 6–8 ounces of AgCn and 10–14 ounces of KCn per gallon. During the application of the final layer of silver, the electrodes are spaced 10–12 inches apart and are connected to a source which supplies 10 amperes per square foot of the surface area of the arbor to be plated. The application of the second layer of silver is especially effective in that the silver strike has provided a surface which is very well suited for the subsequent application of the second metallic layer.

After the final layer of silver has been applied to the arbor, it is washed in cold running water for a period of one to two minutes, and a nickel strike is applied. The nickel strike occurs in a solution comprising 30 ounces of $NiCl_2$ and 16 fluid ounces of commercial grade HCl per gallon water. The electrodes are spaced 10–12 inches apart, although electrode spacing in electroplating systems is generally not critical, and the strike lasts for one minute. The electrodes are connected to a three-volt D-C supply. After the nickel strike has been completed, the arbor is washed in cold running water for 15 to 30 seconds.

The nickel strike results in a rough surface particularly well suited for the application of the final layer of nickel. The nickel plating is done in a commercial solution, such as that marketed by Allied Research, containing 10.4 ounces of nickel metal per gallon. A D-C supply, which supplies 10 amperes per square foot of surface to be plated, is connected for 120 minutes to the electrodes which are spaced 10–12 inches apart. During the nickel plating operation, the solution is constantly agitated, and maintained between 120° and 140°F. The plated arbor is then washed in cold running water for 2 to 5 minutes.

Figure 5:
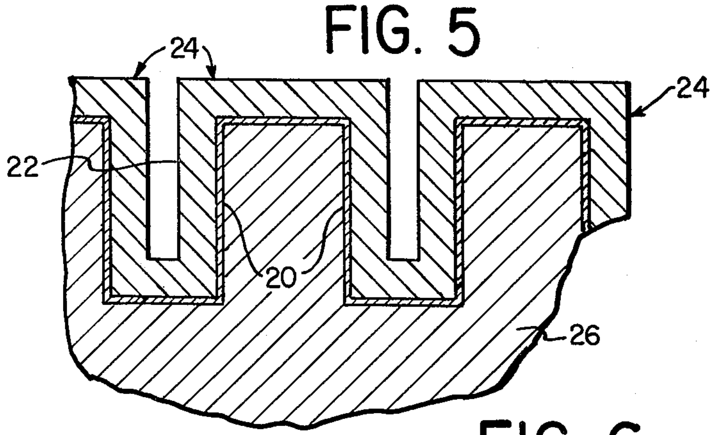
FIG. 5 is a detail in cross section illustrating the formation of the wave guide on the arbor.

FIG. 5 illustrates arbor 26, with silver inner layer 20 and nickel support layer 22. In order to form the flexible section, it is necessary to remove the aluminum arbor 26. This is done by chemical dissolution. The arbor with the silver and nickel layers deposited on it is placed in a solution which is 10–20 percent caustic soda (NaOH) and 80–90 percent water by weight. This solution is maintained at about 190°F. After the arbor is dissolved, the flexible section is removed from the caustic solution and cleaned with acetone. An ultrasonic agitator is preferably connected to a tank containing the cleaner and the wave guide.

Figure 6:
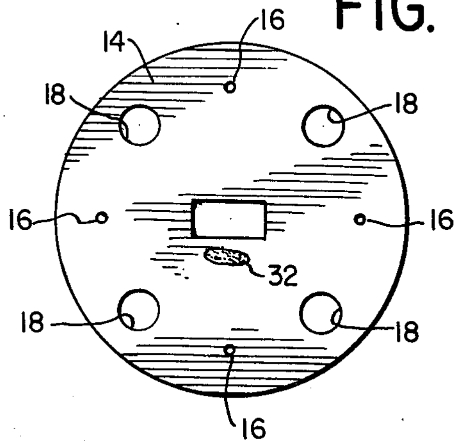
FIG. 6 is an end view of the coupling flange used in the wave guide of the present invention.
Figure 7:
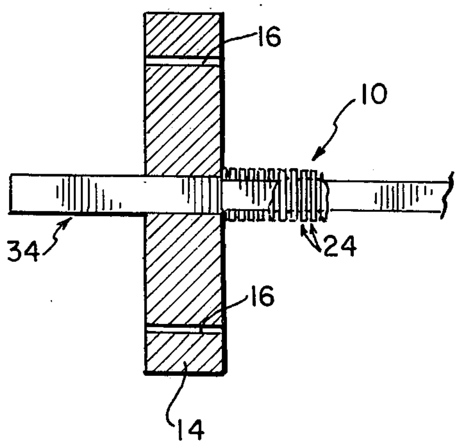
FIG. 7 is a detail partially in cross section illustrating the welding or soldering of the wave guide to the coupling flange.

After the flexible section has been cleaned, it is cut to the desired length at one of the inner convolutions 28 between the outer convolutions 24. This is most easily done using a thin sharp blade, such as a razor blade. Each end of the flexible section is then ground removing all of inner convolution 28 and the outer portion of the first outer convolution leaving an inner silver riser surface 30 as shown in FIG. 2. It is advantageous to maintain inner silver riser surface 30 as a solder joining surface. A small amount of solder 32 is deposited on coupling flange 14 as illustrated in FIG. 6. A tool 34 is then inserted through flexible section 12 and coupling flange 14 as illustrated in FIG. 7. Tool 34 supports flexible section 12 on coupling flange 14. It is shaped with a thin end for receiving the flexible section and a somewhat thicker end for receiving the coupling flange. Soldering is accomplished by maintaining the coupling flange and the flexible section on a tool in the position illustrated in FIG. 7 and applying heat to the assembly either by contacting the soldering gun to the coupling flange 14 or the thick end of tool 34 or any suitable technique which will melt the solder and cause it to flow around the surface between coupling flange 14 and flexible section 12, securely connecting them to each other.

The soldered wave guide is then covered with a jacket made of any suitable material, such as silicone rubber. As discussed above, G.E. RTV 560 has been found to be an acceptable jacketing material.

I claim:

1. A flexible microwave wave guide comprising a highly conductive continuous first layer defining a tube for the propagation of microwaves, said tube having a rectangular cross section and convolutions along its length, said convolutions extending substantially transverse to the direction of propagation of said microwaves, and said convolutions being substantially rectangular in cross section, a continuous convoluted support layer bonded to the outer surface of said first layer, and first coupling means secured to one end of said tube and second coupling means secured to the other end of said tube, the surfaces of the tube contiguous said first and said second coupling means defining and being situated in a plane substantially perpendicular to the longitudinal axis of the tube, said first and second coupling means having passages for the propagation of microwaves, said passage having a cross-sectional size smaller from the cross-sectional size of the tube.

2. A flexible wave guide as in claim 1, further including a flexible jacket disposed around said tube.

3. A flexible wave guide as in claim 1, wherein said convolutions are annular and said flanges are soldered to each of said ends with the first layer of said tube contiguous with said coupling flanges.

4. A flexible wave guide as in claim 3, wherein there are at least eight convolutions per centimeter along the length of the wave guide.

5. A flexible wave guide as in claim 3, wherein said tube has a rectangular cross section having a length substantially twice the length of its width.

6. A flexible wave guide as in claim 3, further including a flexible jacket disposed around said tube.

* * * * *